US008131695B2

(12) United States Patent
Tamai et al.

(10) Patent No.: US 8,131,695 B2
(45) Date of Patent: Mar. 6, 2012

(54) IMAGE PROCESSING APPARATUS AND METHOD DISPLAYING DATA ON DOCUMENTS TO BE OPERATED

(75) Inventors: Yoshiyuki Tamai, Itami (JP); Yoshiki Tokimoto, Nishiwaki (JP); Kimie Mishima, Itami (JP); Masami Yamada, Sennan-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 205 days.

(21) Appl. No.: 11/013,471

(22) Filed: Dec. 17, 2004

(65) Prior Publication Data
US 2006/0053148 A1 Mar. 9, 2006

(30) Foreign Application Priority Data
Sep. 8, 2004 (JP) ................................. 2004-260901

(51) Int. Cl.
*G06F 7/00* (2006.01)
*G06F 17/30* (2006.01)
(52) U.S. Cl. ........ 707/705; 707/736; 707/737; 707/748; 707/758
(58) Field of Classification Search .................. 707/1, 3, 707/10, 102, 705, 758, 736, 737, 748, 999.1
See application file for complete search history.

(56) References Cited

U.S. PATENT DOCUMENTS

| 5,867,162 | A | * | 2/1999 | O'Leary et al. ............... 715/843 |
| 6,134,017 | A | | 10/2000 | Schlank et al. |
| 6,490,594 | B1 | * | 12/2002 | Lomet ........................... 707/200 |
| 6,738,973 | B1 | * | 5/2004 | Rekimoto ..................... 718/104 |
| 6,745,334 | B1 | | 6/2004 | Ikegami |
| 2001/0053301 | A1 | * | 12/2001 | Nishii ............................. 400/63 |
| 2002/0059227 | A1 | * | 5/2002 | Narahara ......................... 707/6 |
| 2002/0059288 | A1 | * | 5/2002 | Yagi et al. ..................... 707/102 |
| 2003/0055823 | A1 | * | 3/2003 | Shibanuma ....................... 707/7 |
| 2003/0233441 | A1 | * | 12/2003 | Nishiyama et al. ............ 709/223 |
| 2004/0024728 | A1 | * | 2/2004 | Suenaga et al. ................. 707/1 |
| 2004/0027601 | A1 | * | 2/2004 | Ito et al. ....................... 358/1.13 |
| 2004/0220962 | A1 | * | 11/2004 | Kaneda ........................ 707/102 |
| 2006/0045386 | A1 | * | 3/2006 | Fukuoka et al. .............. 382/305 |

FOREIGN PATENT DOCUMENTS

| JP | 08-255114 | | 10/1996 |
| JP | 2000-006475 | | 1/2000 |
| JP | 2000-231562 | A | 8/2000 |
| JP | 2000231562 | * | 8/2000 |

(Continued)

OTHER PUBLICATIONS

Official Action (Notification of Reasons of Refusal) issued by the Japanese Patent Office in priority JP Application No. 2004-260901 on Oct. 17, 2006, and English translation thereof.

*Primary Examiner* — Hares Jami
(74) *Attorney, Agent, or Firm* — Buchanan Ingersoll & Rooney PC

(57) ABSTRACT

In an image processing apparatus connected to an external apparatus through a network, a user interface is displayed in a display device on documents. A user's instruction is received in the user interface to operate a document stored in the external apparatus and/or in the image processing apparatus. An operation history of documents stored in the external apparatus is obtained. Then; data on the documents displayed in the user interface is controlled based on the obtained operation history.

9 Claims, 19 Drawing Sheets

FOREIGN PATENT DOCUMENTS

| | | | |
|---|---|---|---|
| JP | 2002-244788 | | 8/2002 |
| JP | 2000231562 | * | 12/2002 |
| JP | 2003-015882 | | 1/2003 |
| JP | 2004-110549 | | 4/2004 |
| JP | 2004-145707 A | | 5/2004 |
| JP | 2004145707 | * | 5/2004 |
| JP | 20041457707 | * | 5/2004 |
| JP | 2004-215135 A | | 7/2004 |

* cited by examiner

IMAGE PROCESSING APPARATUS AND METHOD DISPLAYING DATA ON DOCUMENTS TO BE OPERATED This application is based on application No. 2004-260901 filed in Japan, the contents of which are hereby incorporated by reference.

BACKGROUND OF THE INVENTION

The invention relates to an image processing apparatus connected to an external device through a network.

An image processing apparatus such as a multi-functional peripheral having many functions including a scanner function or the like or a file server is a network device, and files or documents can be registered and processed from an external device connected through a network. In a hard disk drive in the image processing apparatus can store many documents in a storage device wherein a storage medium is divided into storage areas. Each of the storage areas is called a box. An external device sends a file to the image processing apparatus, and the file may be stored as a document in a box. A user can instruct an operation such as copy or print for a file stored in the box. As to an external device such as a computer connected to the image processing apparatus, when the external device provides a box and the image processing apparatus registers the box, a user of the image processing apparatus can operate or process files stored in the external box.

When a document in a box is processed with an operation panel or the like in the image processing apparatus, a document list is displayed in a screen for reference for the user. Then, a user can operate a desired file (document). However, if the number of documents to be displayed is large, it is necessary to scroll the screen to find a file of interest, and it may take a long time until the file is found.

As will be explained later, an operation history is referred to in the invention in the display of a document list in an image processing apparatus. It is known to refer operation history for various operations in a computer or in a network system. For example, if there are many files having a use history, it may take a long time to find a file even when the files having a use history is displayed. Then, a computer described in Japanese Patent laid open Publication 2002-244788 manages the use situation and a use history of files for each application program, and displays a file list according to the use history for the each application program. In a system explained in Japanese Patent laid open Publication 8-255114/1996, an access history of information resources is described in a history file when an information resource is accessed through a network. When a request of access is received from a user, the addresses (information resources) can be displayed in the order of access frequency by referring to the history file. In a file server described in Japanese Patent laid open Publication 2004-110549, data shared in the network is accessed, and a folder to be displayed is changed according to the access right of a log-in user. Only files having the access right are displayed, so that a user can easily understand whether the user has the access right or not. In an image processing apparatus described in Japanese Patent laid open Publication 2004-6475, when print is requested at the same time from a plurality of outputs among copy, fax receive, PC print and stored file, the priority order for the print is determined based on the run history information and the use of the printer is allowed according to the priority order. In an image processing apparatus described in Japanese Patent laid open Publication 2003-15882, storage sites of various programs are stored in a folder in the image processing apparatus, and they are shown for a server or a client. Thus, the positions of the programs become clear.

SUMMARY OF THE INVENTION

An object of the invention is to find a file of interest in a file list in a short time for a user of an image processing apparatus connected to a network.

In one aspect of the present invention, in an image processing method for an image processing apparatus connected to an external apparatus through a network, a user interface is displayed in the display device on documents. A user's instruction is received in the user interface to operate a document stored in the external apparatus and/or in the image processing apparatus. An operation history of documents stored in the external apparatus is obtained. Then; data on the documents displayed in the user interface is controlled based on the obtained operation history.

An advantage of the present invention is that when a file which can be accessed in an image processing apparatus is operated, a document of interest can be found in a short time because relevant documents including files in an external device are displayed.

Another advantage of the present invention is that a document stored in an external device can be operated remotely from the image processing apparatus.

A further advantage of the present invention is that a document of interest can be found in a short time because files accessible in an external apparatus are displayed preferentially.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
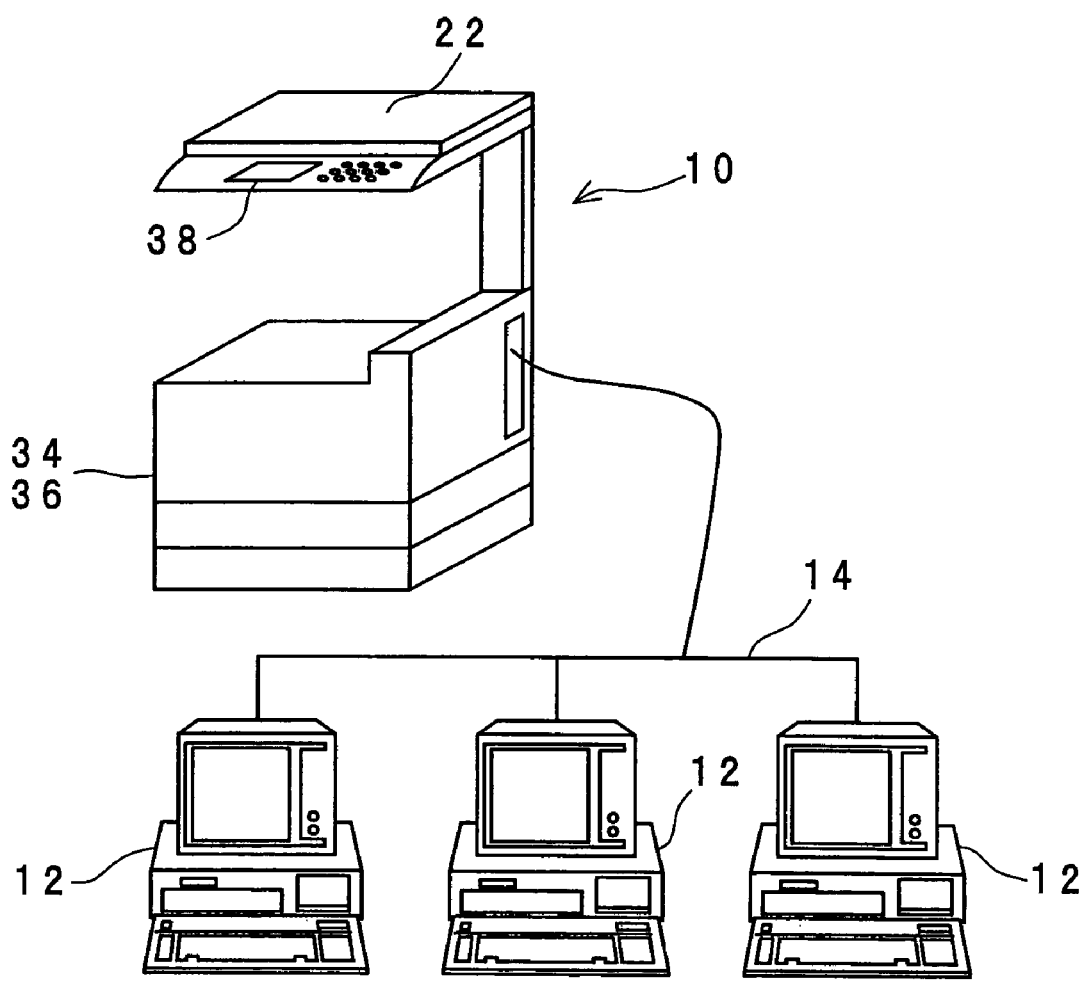
FIG. 1 is a diagram of a network system.

Referring now to the drawings, wherein like reference characters designate like or corresponding parts throughout the several views, In an image processing apparatus such as a multi-functional peripheral (hereinafter referred to as MFP) or a file server, a hard disc drive (a storage device) in the MFP can store many documents. In the embodiments explained below, an MFP is used as an example of the image processing apparatus. A storage medium in the hard disk drive is divided in many storage areas to be used exclusively by users, and each storage area is called a box. A box is provided for example for each user. Further, when a computer connected through a network to the MFP provides a box in a hard disk drive connected to the computer, and the box is registered to the MFP, the box called an external box can be dealt with similarly to the boxes inside the MFP called internal boxes. For example, if a folder in the computer is set to be shared with the MFP, the MFP can deal with the shared folder as an external folder. A user can print, transfer a print a file registered and stored in a box including the external box.

When a file stored in a box in an image processing apparatus is operated it may be conceived to display files having operation history preferentially in order to help a user so as to easily select a file of interest to be operated. In this case, files having no operation history are not displayed preferentially, but a file which a user of the image processing apparatus is likely to use is not limited to files having operation history. For example, after a file is opened by an external device connected to the image processing apparatus, and the file is transferred to and stored in the image processing apparatus, it is not easy to find the file when an operator of the image processing apparatus prints the file or sends a pull print request to an external apparatus. This problem is solved, as explained in detail below, by displaying relevant documents including files in an external device.

When a user of the MFP instructs an operation such as print or transfer on a file stored in a box or an operation such as bind or release secret which needs to browse a file list, the user can search a file of interest by referring to a file list displayed on a display device in an operation panel of the MFP. Because the amount of information displayed in the operation panel is relatively small, if the number of documents to be displayed is large, it is necessary to scroll the screen to find a file of interest, and it may take a long time until a file of interest is found. Then, in this invention, file information is displayed in the order of higher possibility of use. Files having the operation history are considered to have higher possibility. It is already proposed to preferentially display files having a history of print or the like. However, a file of interest does not necessarily have a history of an operation in the MFP. For example, as to files stored in a computer connected to the MFP through the network, the computer has a file named "recently used files" which stores a list of file names of a predetermined number opened most recently. The files registered in "recently used files" in the computer are considered to have a higher possibility to be used later. Therefore, it is desirable to display such files preferentially in an operation in the MFP.

The MFP has a function to remotely access and operate files stored in an external box in a computer connected through a network. Then, when a user operates files accessible in the MFP, relevant files including files in the computers are displayed in the operation panel. The relevant files denote files selected based on an operation history as files which are likely to be used. The operation history is, for example, a file list recorded in a file named "recently used files" in the computers having external boxes registered at the MFP. The file named "recently used files" is set to be shared with the MFP. Then, the MFP reads the "recently used files", and a file list is displayed based on the "recently used files". When a file in an external box is registered in the "recently used files" in the computer, the file is considered a relevant file. The MFP has a function to determine whether a file in the external box is the same as a file in the "recently used files", and when a file in the shared box is found the same as a file in the "recently used files", the MFP shows the file preferentially in a file list. By displaying the relevant files as explained above, a user can find a file to be operated in a shorter time. If an extension of file name is checked on the files to be displayed, files unnecessary to be displayed can be omitted. Then, the unnecessary files are not displayed.

Alternatively, a file for recording an operation history different from the "recently used files" may be provided and shared with the MFP. For example, a list of files opened by a particular application program or a list of files used for a particular processing such as image edition is recorded, and it is referred to on file retrieval to display files which are likely to be used.

In the image processing apparatus of the invention, when a file which can be accessed in the image processing apparatus is operated, a document of interest can be found in a short time because relevant documents including files in an external device are displayed. If files accessible in an external apparatus are displayed preferentially, a document of interest can be found in a short time.

Next, an image processing apparatus according to a first embodiment of the invention is explained. In a network system shown in FIG. 1, an MFP 10 as an example of an image processing apparatus and computers (PC) 12 are connected through a network 14 such as a local area network. The MFP has many functions operable as a printer, a scanner, a copying machine, a facsimile apparatus in correspondence to an instruction from the computers 12.

Figure 2:
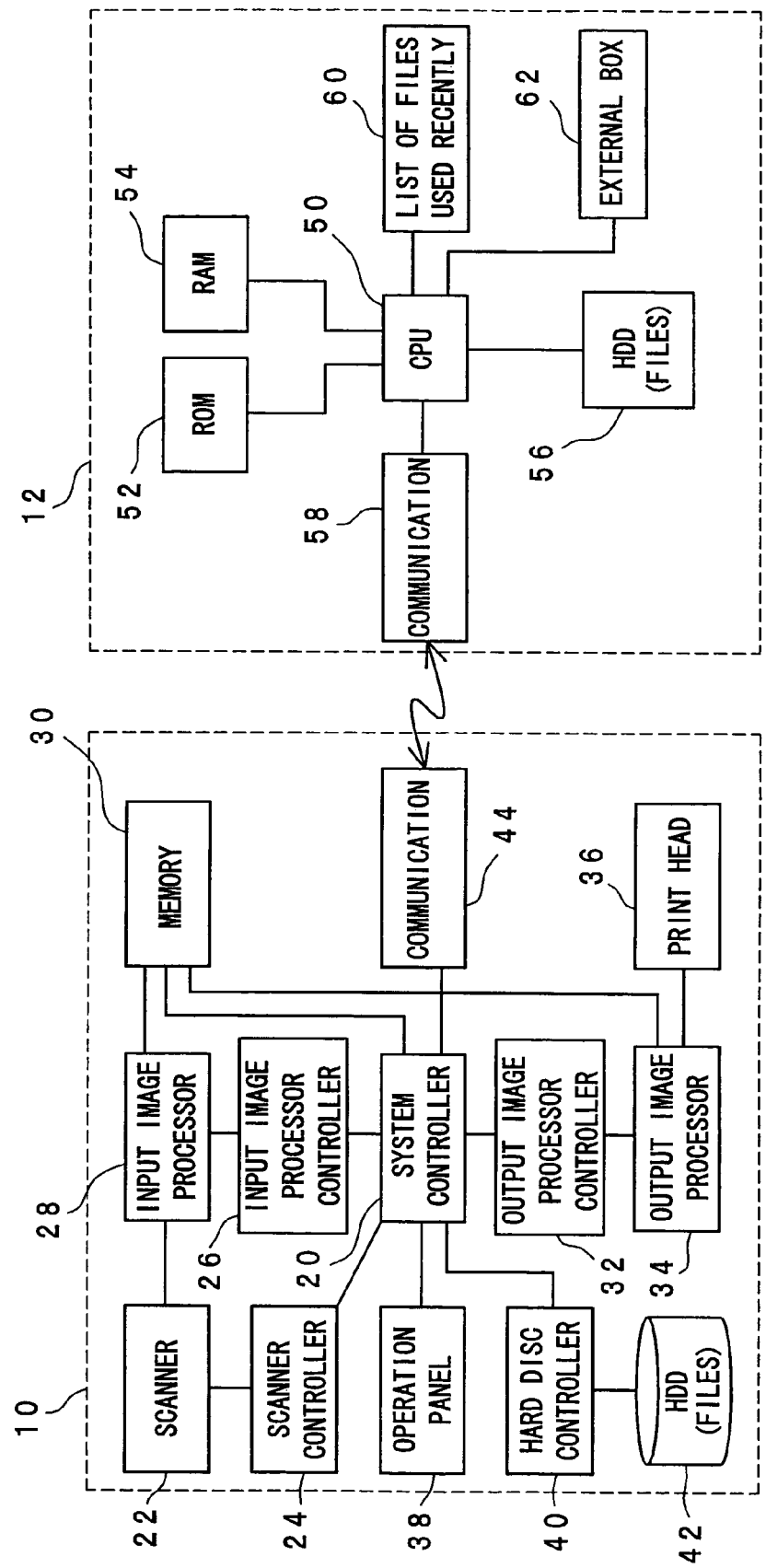
FIG. 2 is a block diagram of a multi-functional peripheral and a computer.

FIG. 2 is a block diagram of the MFP 10 and the computer 12. The MFP 10 has a system controller 20 including a central processing unit (CPU) for controlling the entire MFP 10. When it is operated as a scanner, a scanner 22 reads an image under the control of a scanner controller 24. The input image data is processed by an image processor 28 with use of a memory device 30. When it is operated as a printer, an output image is processed under the control of an output image controller 32 and is printed with a print head 36. An operation panel 38 has a display device with a screen, displays various screens for user interface and receives various instructions or data by a user. A hard disk controller 40 controls a hard disk drive 42. The hard disk drive 42 includes file storage areas named boxes, and user's files can be stored in a box assigned for each user. The hard disk drive 42 also stores a file which records a list of registered boxes. A communication device 44 performs communication through the network 14. A facsimile function of the MFP is not explained here.

On the other hand, the computer 12 has a central processing unit (CPU) 50 for controlling the entire computer 12. The CPU 50 is connected to a read-only memory 52 for storing programs and the like, a random access memory 54 used as a work area, a storage device such as a hard disk drive 56 having a large storage capacity and a communication device 58. The hard disk drive 56 stores a file 60 named "files used recently".

This file is shared with the MFP 10 and stores file names of the files opened recently sequentially. Further, the hard disk drive 56 provides a storage area called an external box 62. The external box 62 is a box present outside the MFP 10 and is registered at MFP 10. For example, it is a folder shared with the MFP 10. Files stored in the external box 62 can be accessed at the MFP 10. It is to be noted that the structures shown in FIGS. 1 and 2 are common to the other embodiments.

In this embodiment, a user can instruct to bind files. "Bind" means to combine a plurality of files. In a bind operation, when a user selects a file in the operation panel 38, a list of files which are likely to be combined is displayed in the screen. For example, a file list of "files used recently" is obtained from the external device or the computer 12, and the file list is displayed as candidates of one or more files to be bound. After a user selects and determines a file or files to be bound, he or she selects an operation of print, box storage or transmission for the combined files. Then, the selected operation such as print is performed on the bound files. This is explained below in detail.

Figure 3:
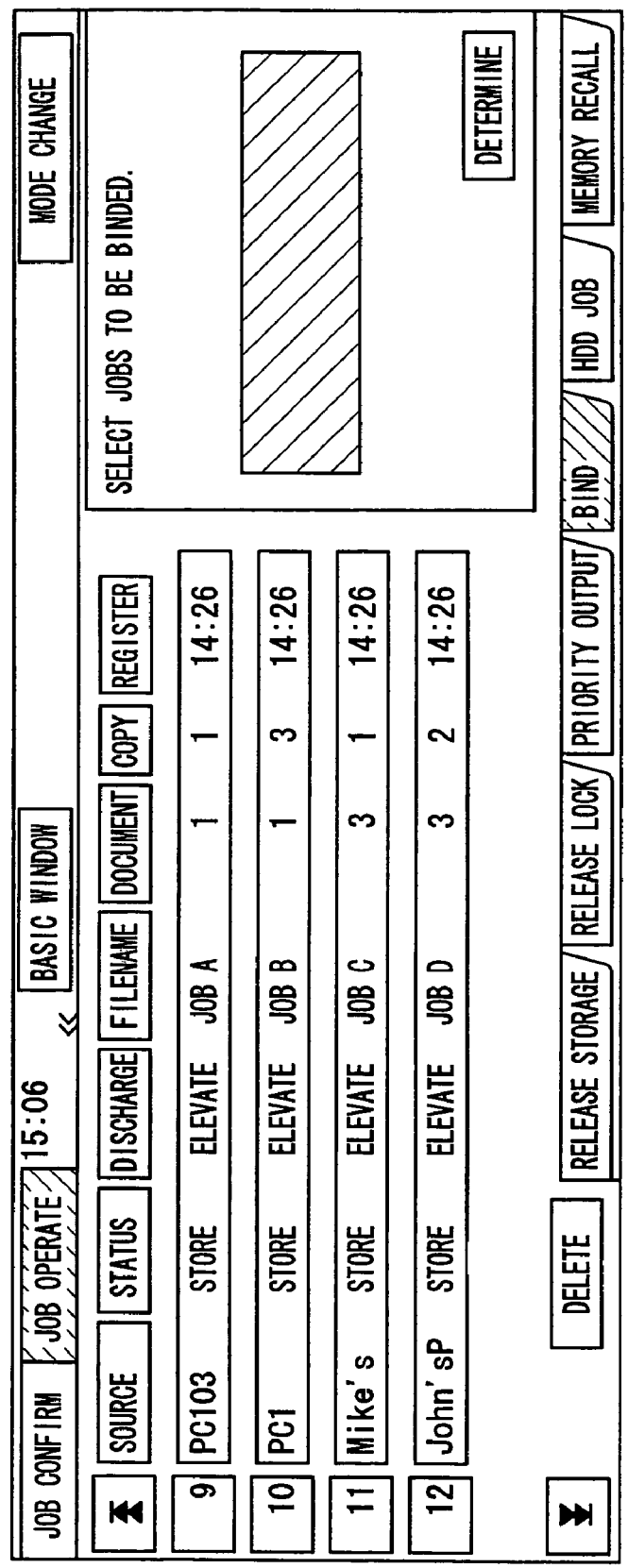
FIG. 3 is a diagram of a file selection screen.

First, a file list is displayed in a file selection screen in the operation panel 38 of the MFP 10. FIG. 3 shows an example of the file selection screen. In the screen, bind is selected in the operations shown at the bottom of the screen of release storage, release lock, priority output, bind, HDD job and memory call. In this example, file names are displayed as job names. In the left half of the screen, a list of files registered in the MFP is displayed as files to be bound. In the screen shown in FIG. 3, four files from the ninth to twelfth files are shown. The data shown on each file include a source and a file name thereof. At the right side in the screen, a message of "select jobs to be bound" and a determine button are displayed.

Figure 4:
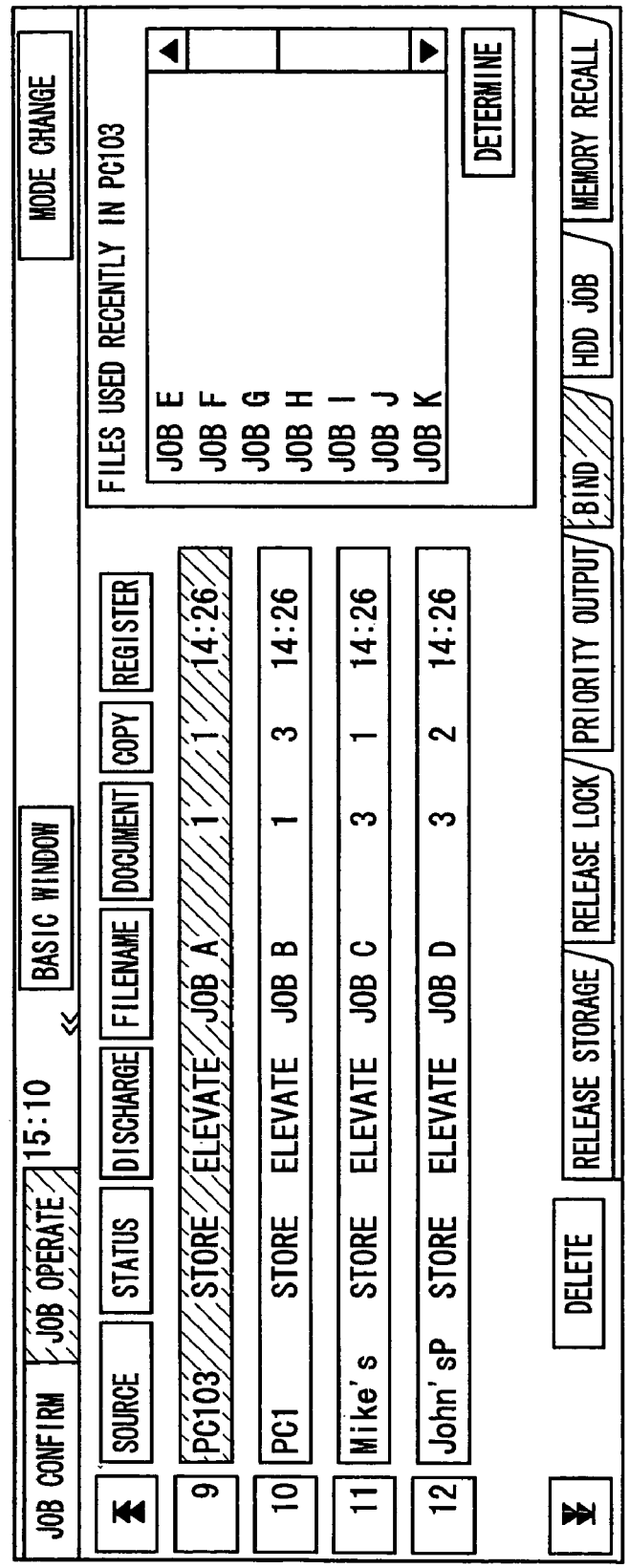
FIG. 4 is a diagram of a screen when a file of job B is selected.

FIG. 4 is a diagram of a screen when a file having a job name of job A is selected by a user. The source of job A is a computer named PC103. When job A is selected, a list 60 of files in the "recently used files" is obtained next from the resource which registers the file (PC103 in this example) as candidates of files to be combined. Then, the list of the recently used files is displayed at the right side in the screen.

Figure 5:
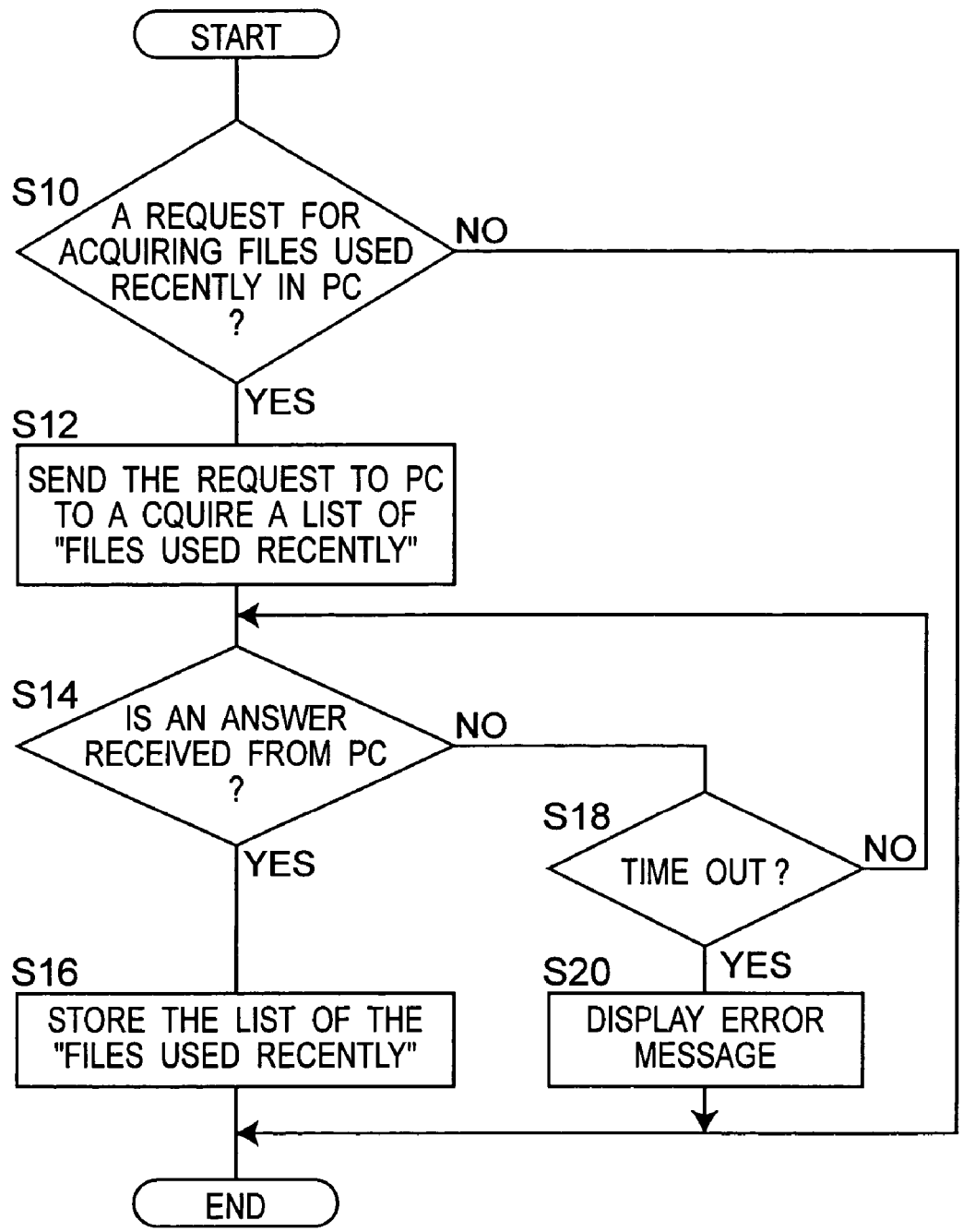
FIG. 5 is a flowchart for obtaining a list of "recently used files"

FIG. 5 is a flowchart for obtaining a list of "recently used files" of the system controller 20 in the MFP 10. When a request for obtaining "recently used files" for the external box in the computer 12 is received (S10), a request is sent to the computer 12 for sending the list of the "recently used files" (S12). When a reply for the request is received from the computer 12 (YES at S14), the received list is stored (S16). On the other hand, when a reply for the request is not received from the computer 12 (NO at S14), and if a predetermined time has not yet elapsed (NO at S18), the flow returns to step S12. When the predetermined time has elapsed without receiving a reply (YES at S18), an error message is displayed.

Figure 6:
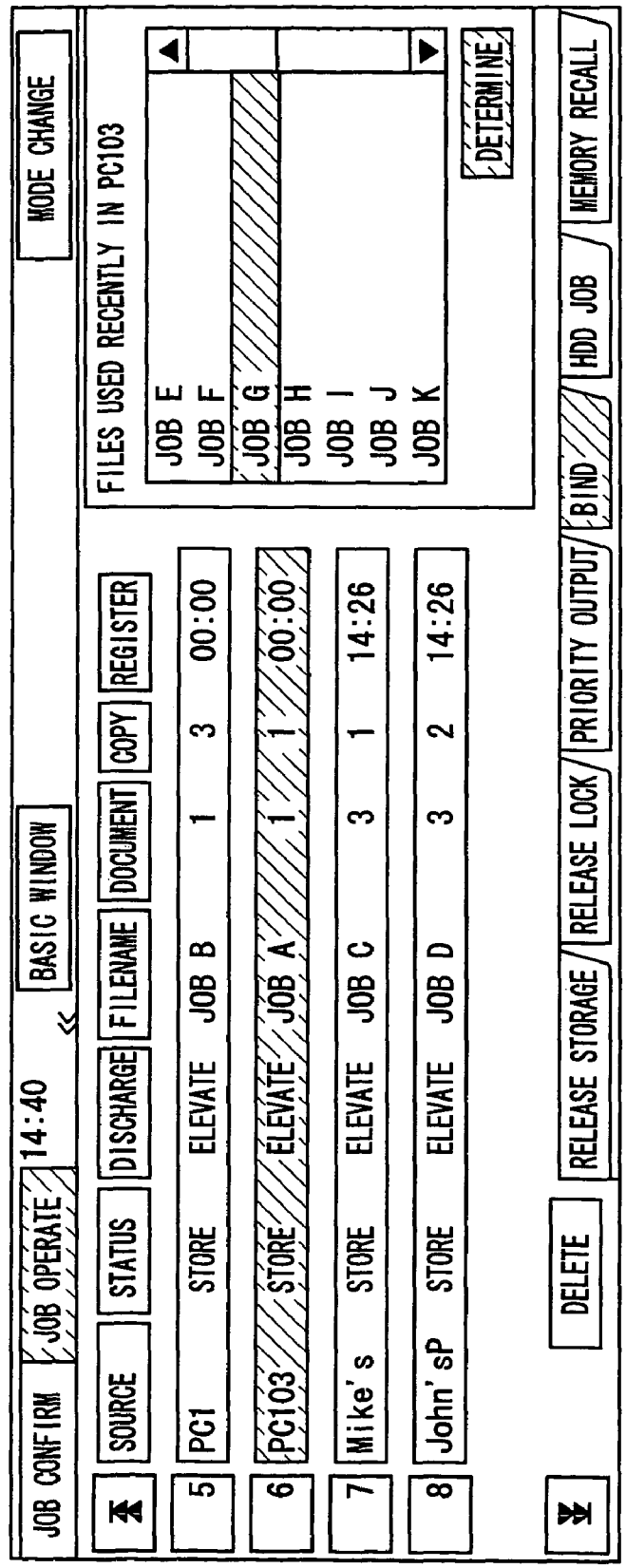
FIG. 6 is a diagram of a file selection screen.
Figure 7:
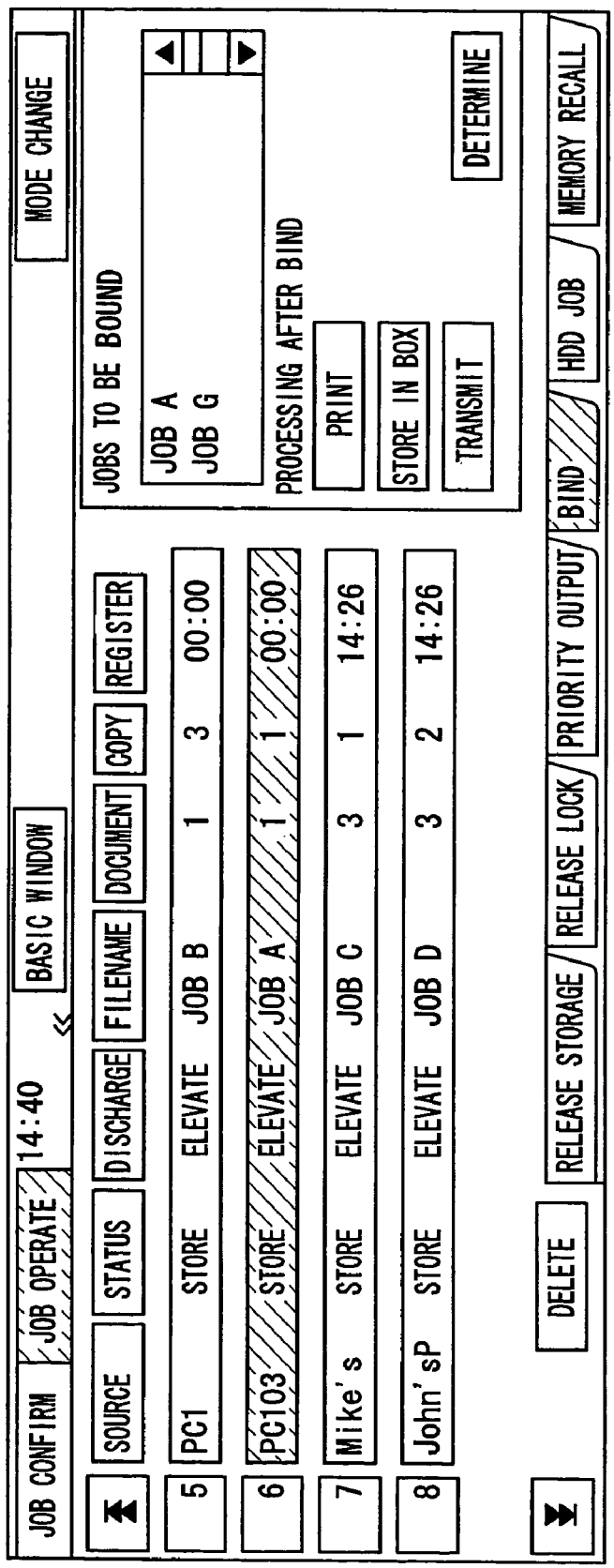
FIG. 7 is a diagram of a file selection screen.

Next, one or more files to be bound are selected by a user in the file list. In an example of the screen shown in FIG. 6, a user selects a file of job G among the recently used files in the computer PC103. Next, when the user presses the DETERMINE button, a screen shown in FIG. 7 is displayed wherein jobs A and G are displayed as files to be bound in the right side. Further, for an operation t-o be performed after the binding, buttons for print, store in box and transmit are displayed. When the selected processing is store in box or transmit, a screen (not shown) for selecting a destination or address is displayed, and a user inputs the destination. After the user selects on of the buttons, the operation therefor is executed on the bound files.

Next, an image processing apparatus according to a second embodiment of the invention is explained. In this embodiment, the MFP 10 has a function to browse and operate files in the external box in the computer 12 in the operation panel 38. Preferably, when the MFP 10 browses the shared folder in the computer 12, the files registered in the "recently used files" in the computer are displayed preferentially. In concrete, when a user selects a box to be browsed, files to be displayed in the file list are selected among the files stored in selected the box by considering the operation history in the computer.

First, in the operation panel 38 of the MFP 10, a box selection screen is displayed. In the screen, both of internal boxes and external boxes are displayed. A user selects a box to be browsed in the boxes. In an example shown in FIG. 8, eight rectangles represent the boxes. Three boxes named PUBLIC, Temp and Neptune are external boxes, and a pattern below each rectangle means that the rectangle represents an external box. In the screen, five inner boxes in the MFP 10 are displayed besides the three external boxes.

Figure 9:
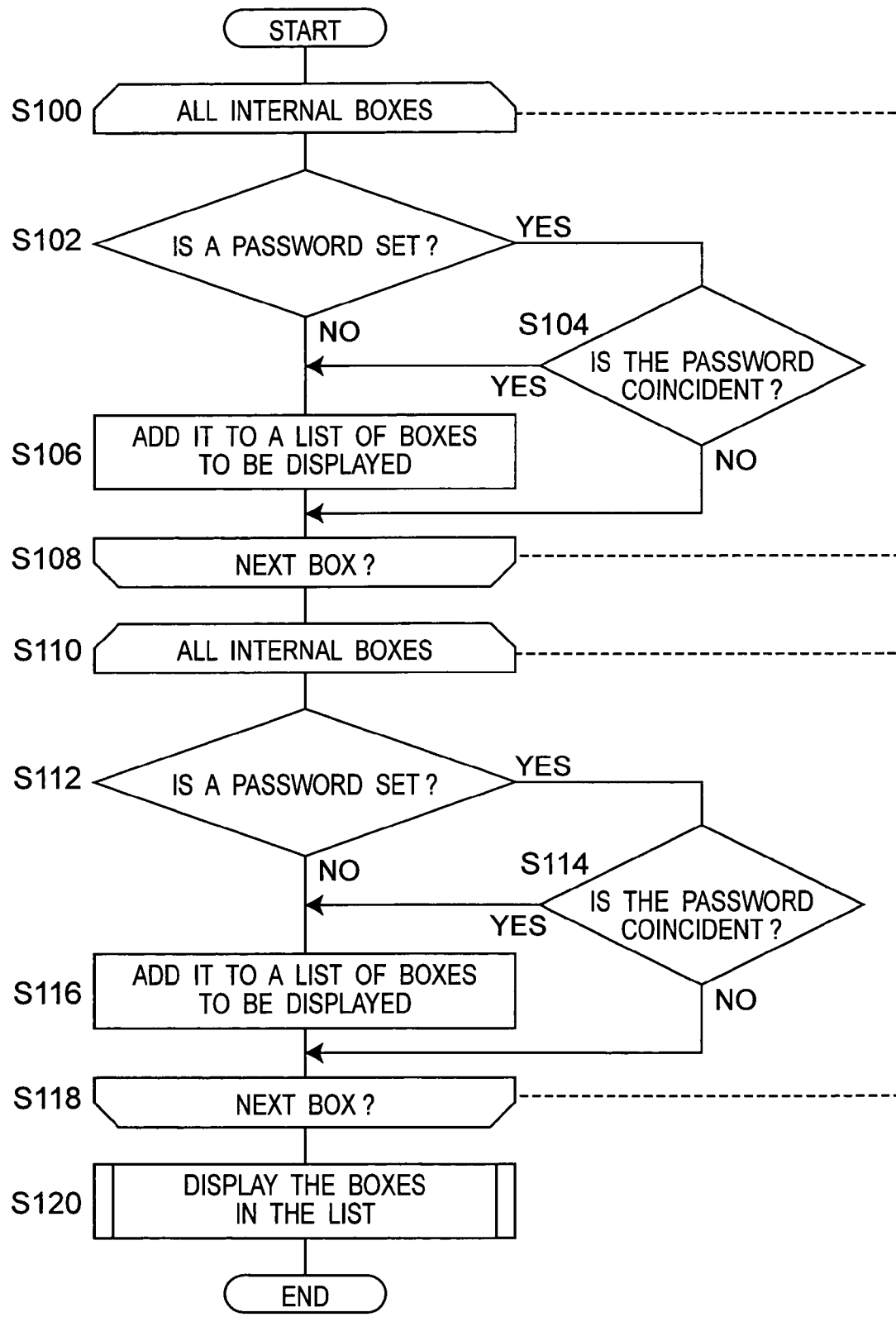
FIG. 9 is a flowchart of box display.

FIG. 9 is a flowchart of box display of the system controller 20 in the MFP 10. First a loop is performed on the internal boxes. One of the internal boxes is selected (S100), and when a password is registered on the selected box (YES at S102), user authentication is performed. When the password inputted by the user is coincident to the registered password (YES at S104), the internal box is added to a list of boxes to be displayed. (S106). If an internal box is remained not yet processed (YES at S108), the flow returns to step S100 and the above-mentioned processing is repeated.

After all the internal boxes are processed, a loop on external boxes is started. One of the external boxes is selected (S110), and when a password is registered on the selected box (YES at S112), user authentication is performed. When the password inputted by the user is coincident to the registered password (YES at S114), the external box is added to a list of boxes to be displayed (S116). If an external box is remained not yet processed (YES at S118), the flow returns to step S110 and the above-mentioned processing is repeated.

Figure 8:
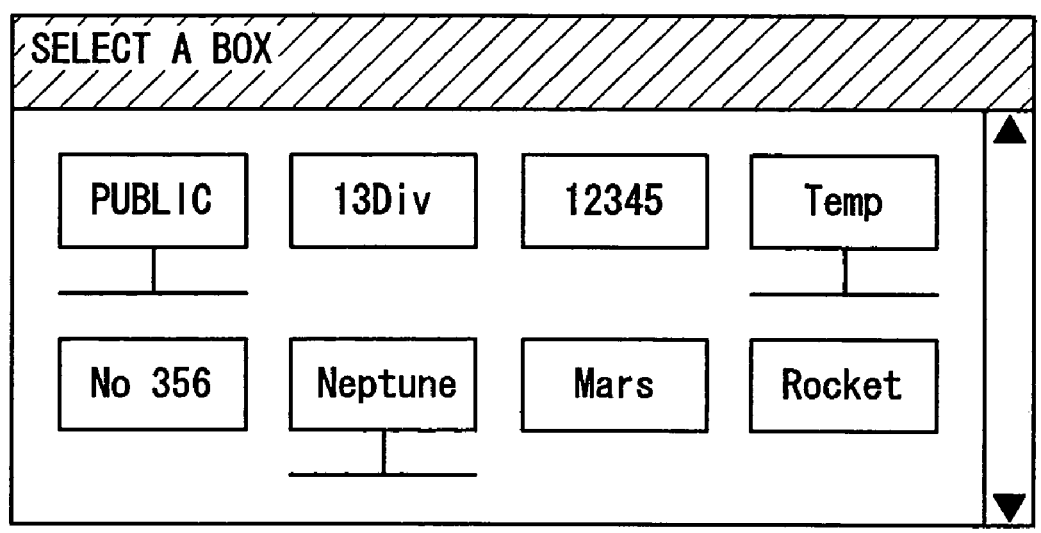
FIG. 8 is a diagram of a box display screen.

After all the external boxes are processed, the boxes in the box list are displayed in a screen of the operation panel 38 (refer to FIG. 8).

Figure 10:
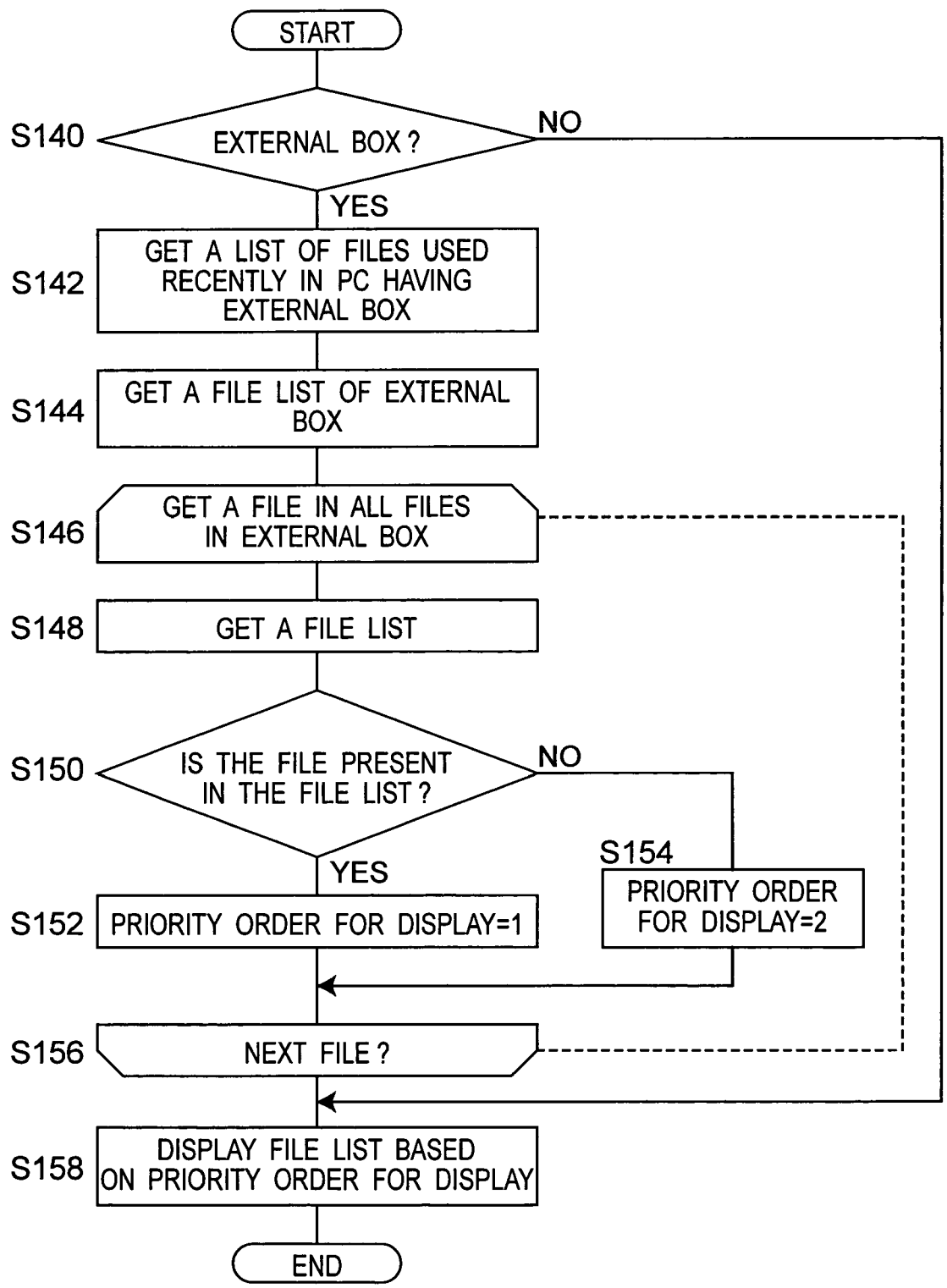
FIG. 10 is a flowchart for displaying files in a box.

FIG. 10 is a flowchart for displaying a file list of files in a box of the system controller 20 in the MFP 10. First, it is decided whether the box selected by the user is an external box or not (S140). If it is decided an external box, a list 62 of recently used files in the computer 12 having the external box is obtained (S142). Further, a file list of the external box is received (S144). Next, all the files in the external box are processed as follows. First, a file in the files is obtained (S146), and a file list is obtained (S148). Then it is decided whether the file exists in the list of "recently used files" or not (S150). If it is present in the list of "recently used files", the priority order of the file is set to "1" (S152), while If it is not present in the list, the priority order is set to "2" (S154). Next, if there remains a file not yet processed (YES at S156), the flow returns to step S146, and the above-mentioned processing is repeated. If the box selected by the user is decided not an external box (NO at S140), the flow proceeds to step S158. Then, a file list is displayed according to the above-mentioned priority order on the files in the box (S158).

Figure 11:
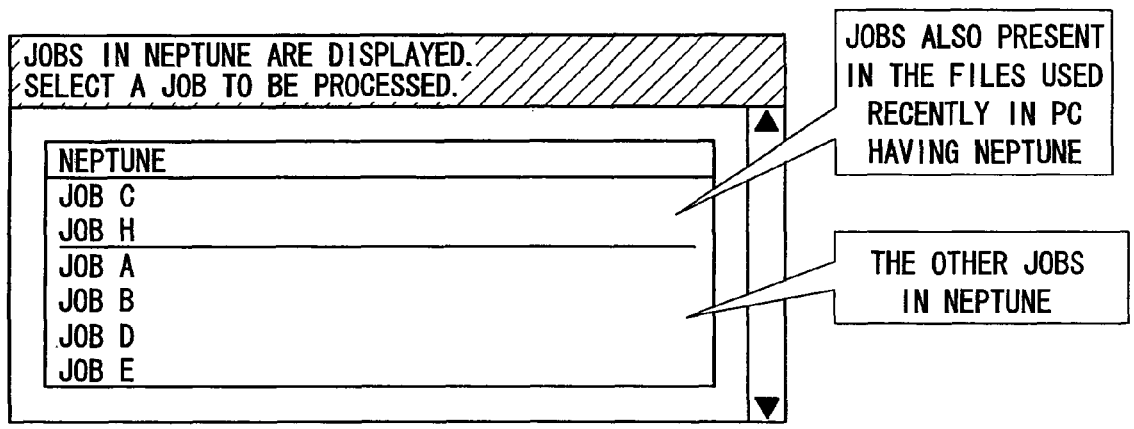
FIG. 11 is a diagram of a screen for displaying files in a box.

As will be understood in the processing shown in FIG. 10, when the box selected by the user is an external box, the file list on the shared folder in the computer 12 having the external box is obtained from the computer (refer to FIG. 5). Further, the list of "recently used files" of the MFP 10 is obtained. (Because this processing is similar to that shown in FIG. 5, its explanation is omitted.) Then, the file list of the shared folder in the computer 12 is compared with the list of "recently used files" in the computer 12, and files contained in both lists are displayed preferentially. FIG. 11 shows an example of a screen for displaying files in the box. In this example, jobs C and H displayed preferentially in the file list are also present in the recently used files in the computer having the box named NEPTUNE, and the other files in the external box are displayed below them.

Next, an image processing apparatus according to a third embodiment of the invention is explained. In this embodiment, besides the recently used files in the MFP 10, the recently used files in the computer 12 connected to the MFP 10 can also be displayed.

Figure 12:
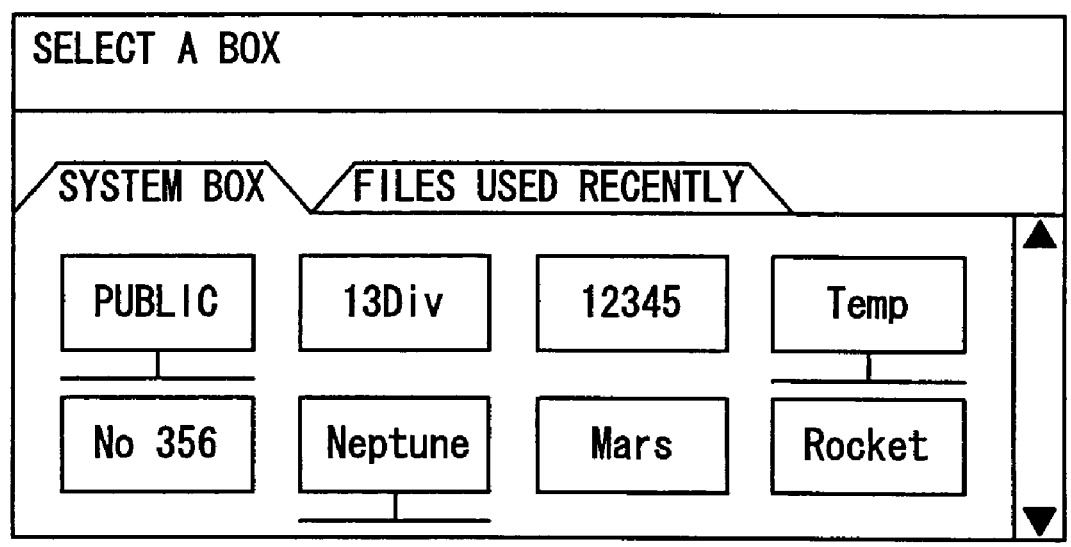
FIG. 12 is a diagram of a screen for displaying a box list.
Figure 13:
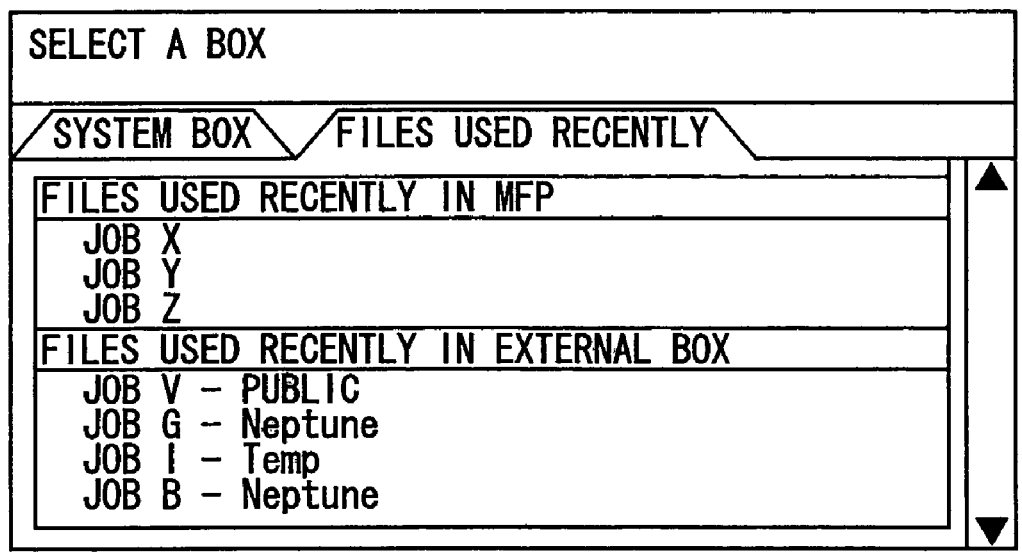
FIG. 13 is a diagram of a screen showing a list of "recently used files"

In a screen shown in FIG. 12, a box list of boxes in the system or recently used files can be displayed in turn. FIG. 12 shows a state when the box list in the system is displayed. On the other hand, when a user selects "files used recently" tab, when external boxes which can be browsed are present besides the list of "recently used files" in the MFP 19, files registered also in the list of "recently used files" in the computers are displayed among the files in each external box. Further, besides the files of "recently used files" of the computer 12, those of "recently used files" in the MFP 10 are also displayed equally. FIG. 13 shows an screen of this example wherein "Files used recently" tab is selected. Besides the list of files used recently in the MFP 10, a list of files used recently in the computer is also displayed. Then, one of the file in the recently used files in the computer is selected, the file in the computer 12 can be operated at the side of the MFP 10.

Figure 14:
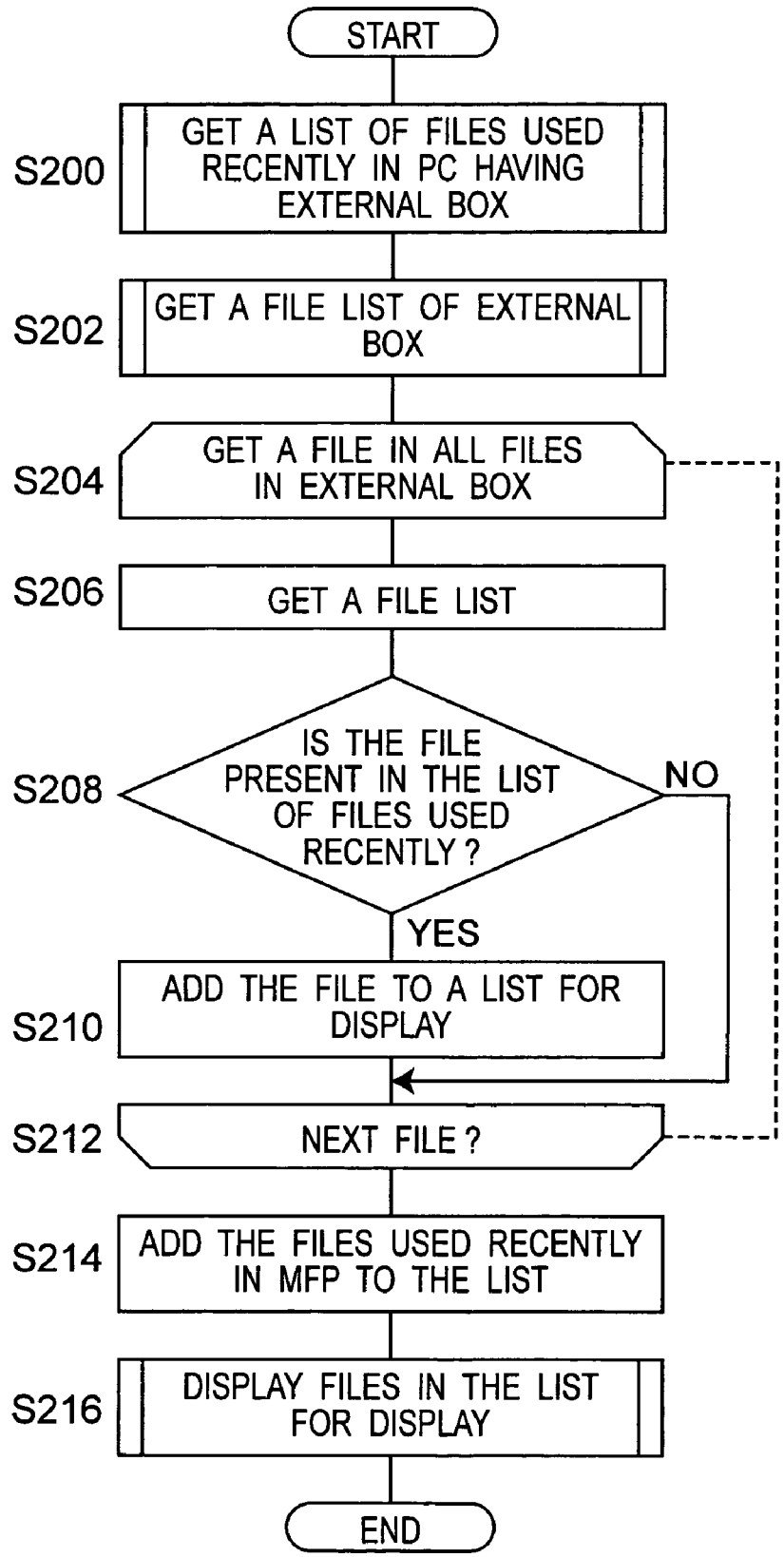
FIG. 14 is a flowchart of a processing for displaying files used recently.

FIG. 14 is a flowchart of a processing for displaying files used recently of the system controller 20 in the MFP 10. In the screen shown in FIG. 12, when a tab of "files used recently" is selected, a list of "recently used files" in the computer 12 having the external box is obtained (S200), and a file list of the external box is also obtained (S202).

Next, as to all the files in the external box, the file list in the shared folder in the computer having the external box is compared with that of the "recently used files" in the computer, and files included in the two file lists simultaneously are displayed. First, a file in all the files in the external box is selected (S204), and a list of the recently used files is received (S206). If the file is present in the file list (YES at S208), the file is added to a list of files to be displayed (S210). When a file not yet processed is remained (YES at S212), the flow returns to step S204, and the above-mentioned processing is repeated. After all the files are processed, the list of the recently used files in the MFP 10 is obtained, and the files are added to the file list for display (S214). Therefore, the file list for display includes files in the file list of the computer 12 and those in the MFP 10 equally. Next, the files in the list for display are displayed in a screen of the operation panel 38 (S216).

Next, an image processing apparatus according to a fourth embodiment of the invention is explained. In this embodiment, when a user selects an operation in the operation panel 38, files on which the operation is possible are searched, and a list of the files is created and displayed in a screen of the operation panel 38. For example, the operation is memory recall, and when the memory recall operation is selected, files on which the memory recall is possible are searched to create a list of such files, and the list is displayed in a screen of the operation panel 38. A file on which memory recall is possible denotes a file which has been deleted from the memory device by an operation of clear or the like, but can be read still from the storage device. When a list of the files which can be recalled from the memory device is displayed, a list of "recently used files" in the computer 12 is obtained, and files included also in the "recently used files" are displayed preferentially among the files which can be recalled from the memory. That is, when an operation is instructed to browse files which can be recalled from the memory device, the list of the files which can be recalled from the memory device is compared with that of the recently used files, and files included in the two lists simultaneously are displayed preferentially.

Figure 15:
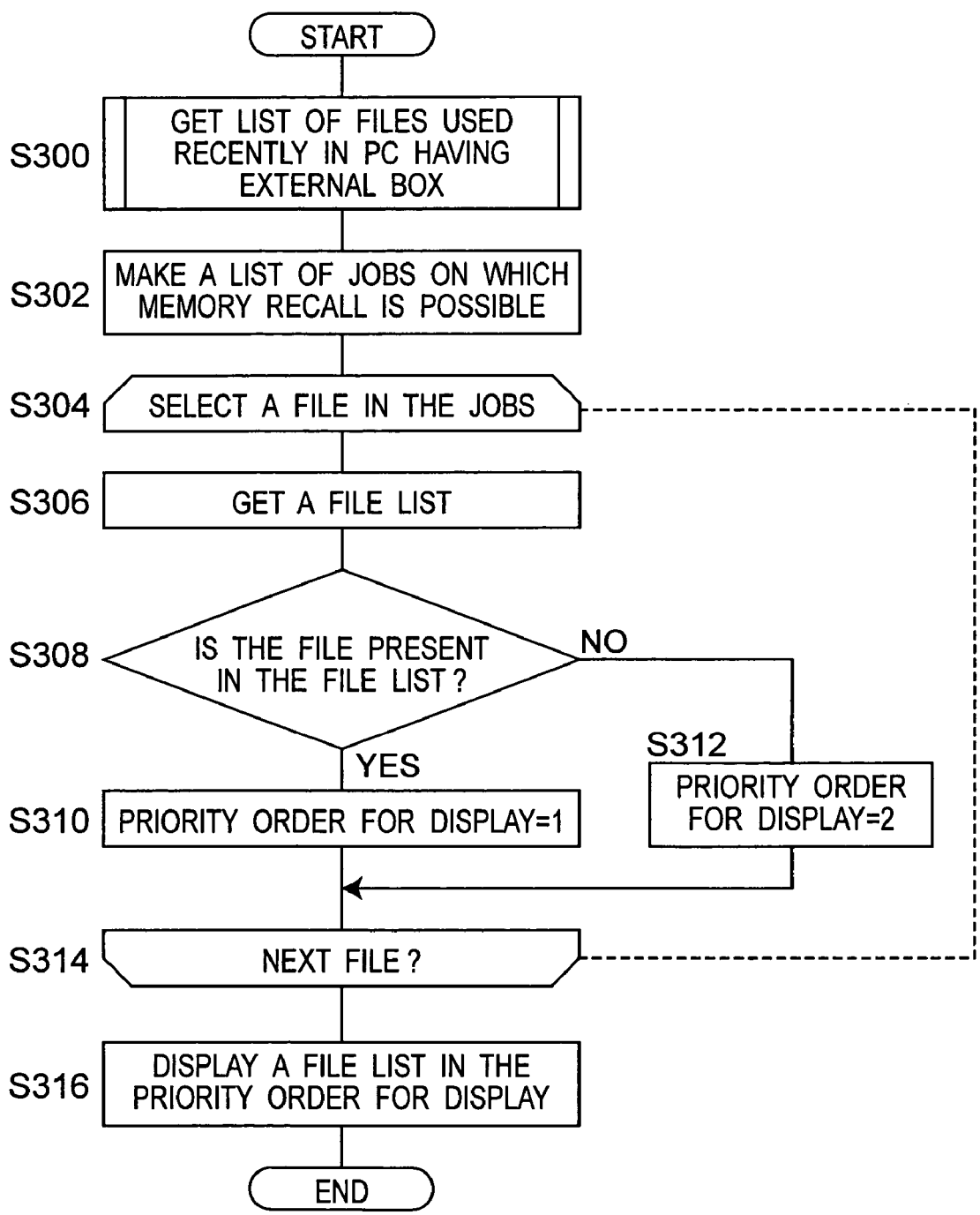
FIG. 15 is a flowchart of a processing for displaying memory recall files.

FIG. 15 is a flowchart of a processing for displaying files which can be recalled from the memory device of the system controller 20 in the MFP 10. When an instruction to browse files on which the memory recall is possible is selected by a user in the operation panel 38, a list of "recently used files" in the computer 12 having an external box that can be browsed is obtained (S300), and a list of the files (or memory recall jobs) which can be recalled from the memory device is created (S302).

Next, a file in the memory recall jobs is selected (S304), and a file list of "recently used files" is obtained (S306). Then, it is decided whether the file is present in the file list (S308). If the file is present in the file list, the priority order of the file for display is set to "1" (S310), while if the file is not present in the file list, the priority order is set to "0" (S312). If a file not yet processed remains (YES at S314), the flow returns to step S304, and the above-mentioned procedure is repeated. After the priority order is set to all the files, a list of the memory recall job files is displayed in a screen (refer to FIG. 16) according to the priority order (S316).

Figure 16:
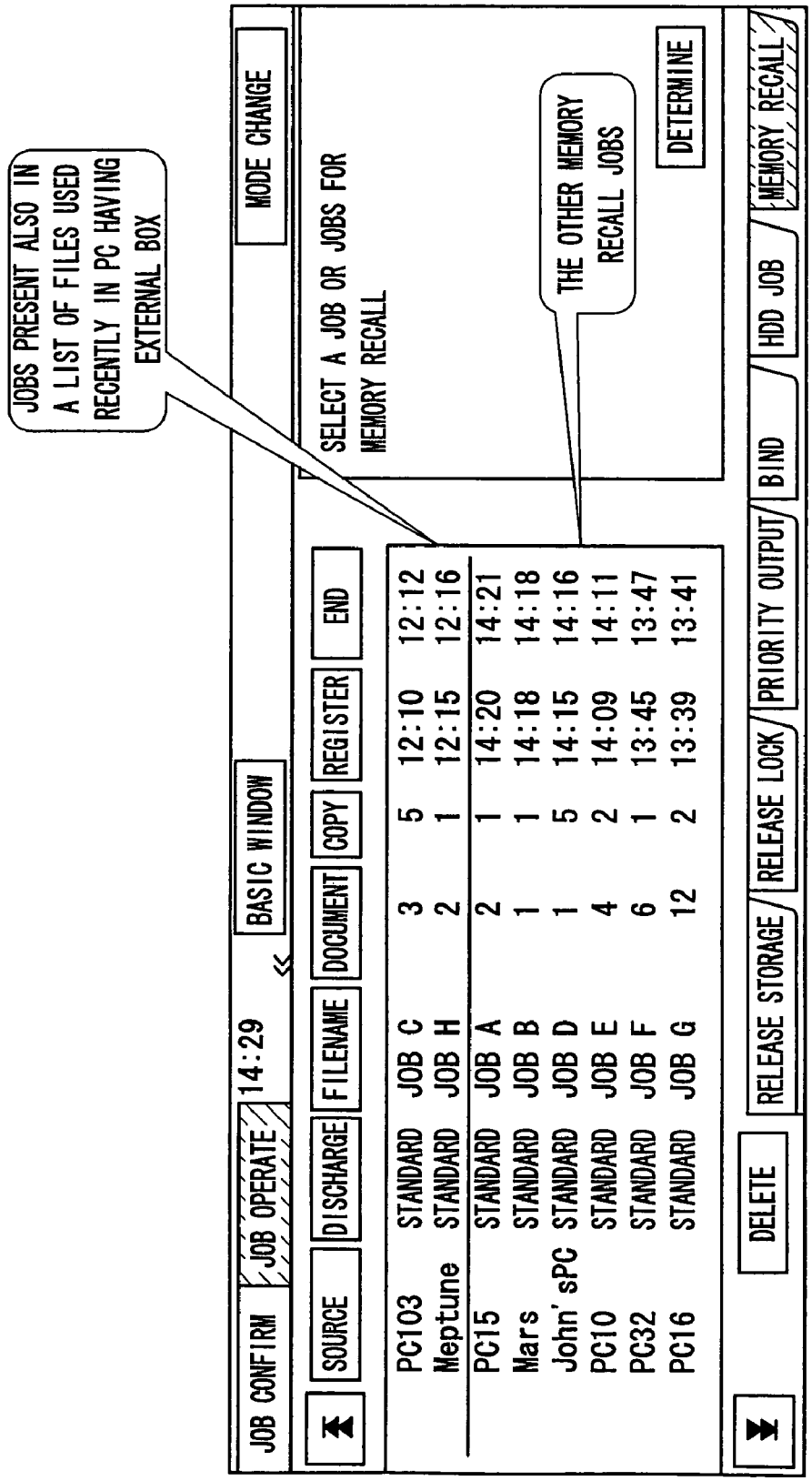
FIG. 16 is a diagram of a screen for displaying a list of memory recall files.

FIG. 16 shows an example of a screen for displaying a list of files possible to be recalled from the memory. In the screen, two memory recall jobs present also in the recently used files in the computers having the external box are displayed. Further, the other files are displayed below a division line.

Figure 17:
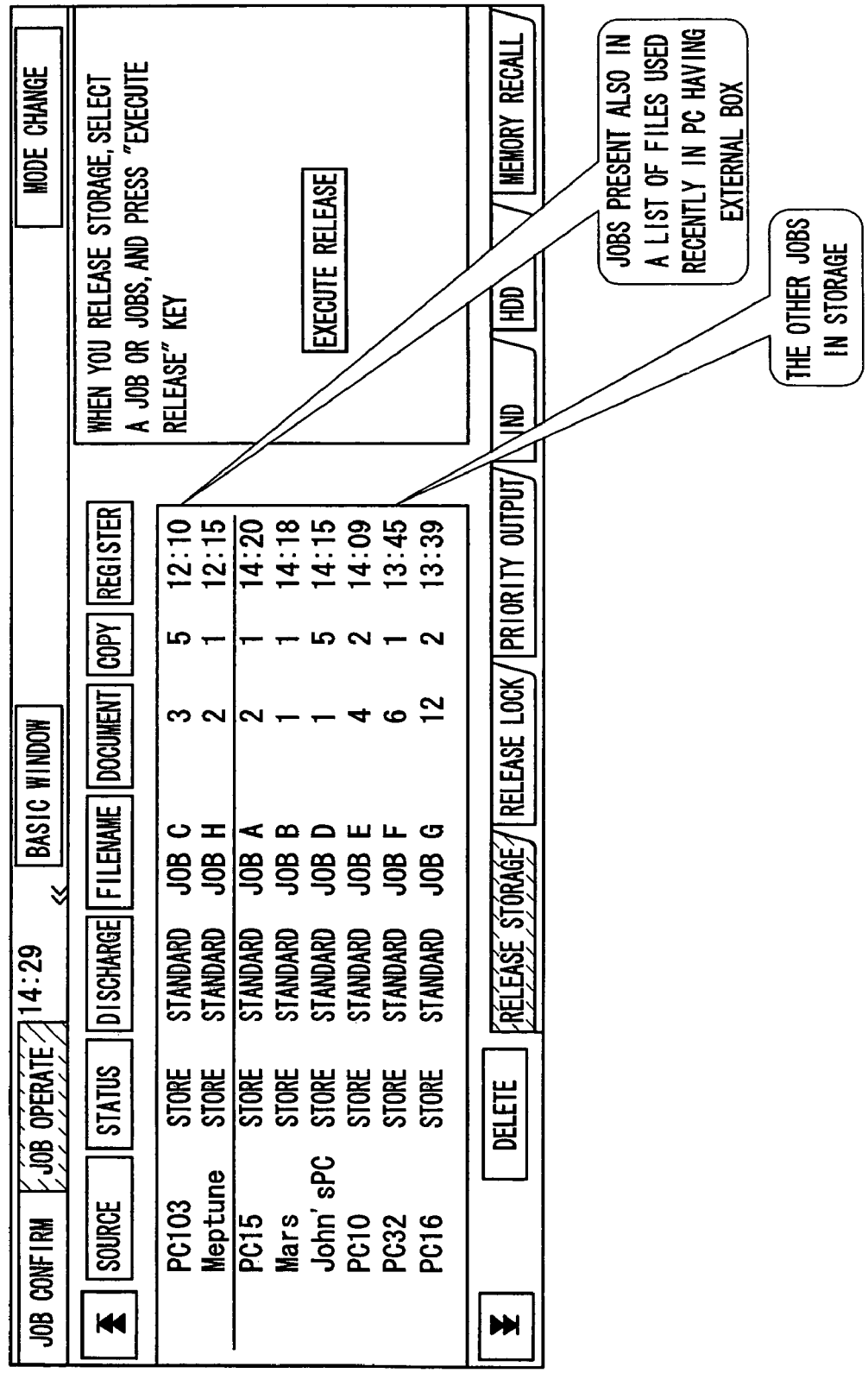
FIG. 17 is a diagram of a screen for displaying stored files.

In the above-mentioned example, file list display is explained when an operation of "memory recall" is selected, but a similar screen can be displayed on another operation. FIG. 17 shows a screen for displaying stored files when an operation of "release storage" is selected. Stored files denote files stored in an external box. When a user wants to release a file from the box, a user selects "release storage". Then, the user selects a file among the file list displayed in the screen, and presses the DETERMINE button. Then, the file is released from the box. In an example shown in FIG. 17, files present also in the recently used files in the computer 12 are displayed preferentially among the files stored in the box in the computer 12. A flowchart of this display processing is similar to FIG. 15, and an explanation thereof is omitted here.

Figure 18:
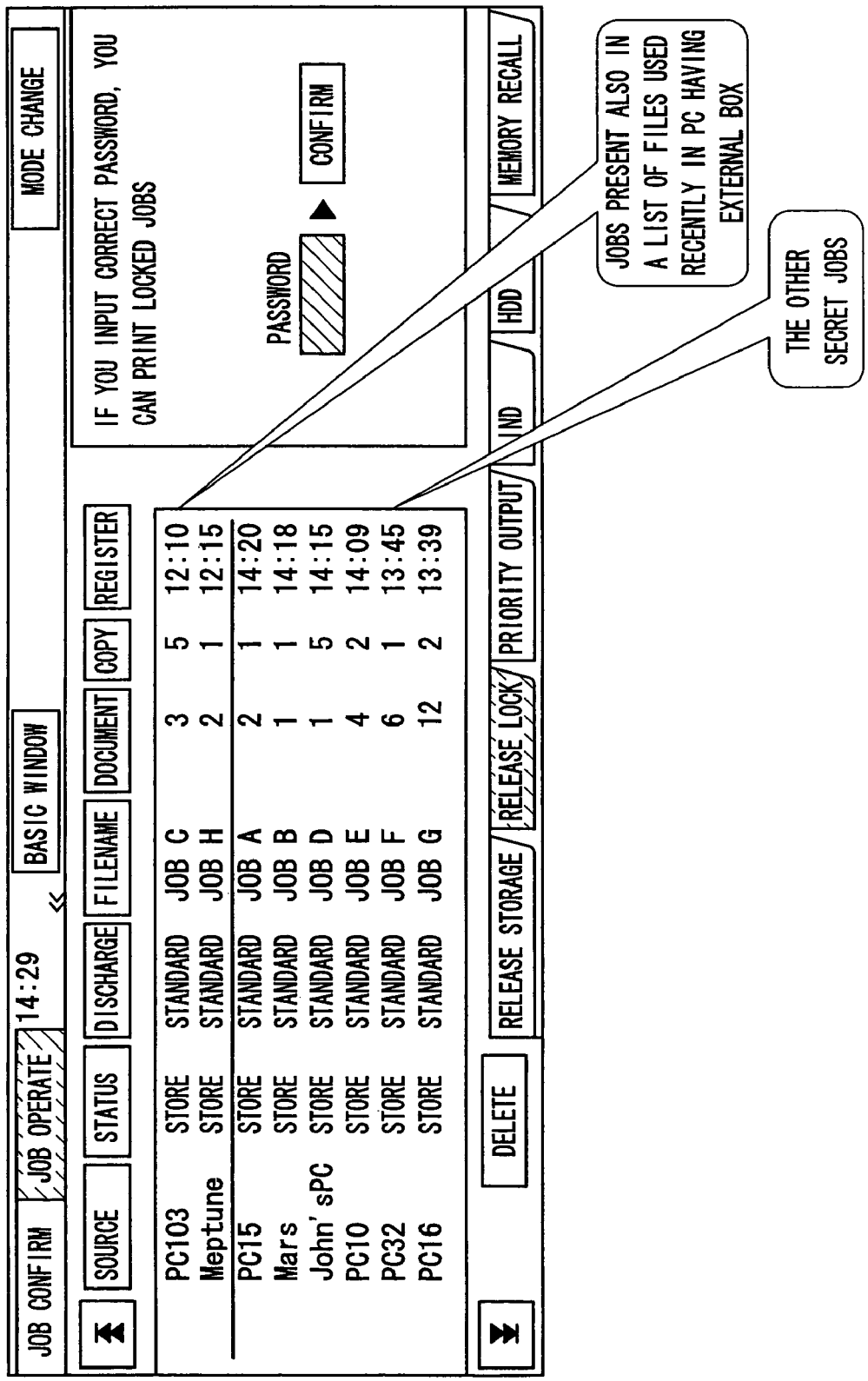
FIG. 18 is a diagram of a screen for displaying secret print files.

FIG. 18 shows a screen for displaying files for release lock or secret print. Release lock means to release a setting of secrecy on a file. If the secrecy of a file is released, the file can be printed without inputting a password. When a user selects "release lock" and selects a file in the file list in a screen, the lock of the file as a secret file is released. In the example shown in FIG. 18, files included also in the "recently used files" in the computer are displayed preferentially among the files stored in the external box or a shared folder in the computer 12.

Next, an image processing apparatus according to a fifth embodiment of the invention is explained. As explained above on the fourth embodiment, when a user selects an operation in the operation panel 38, a list on which the operation is possible is displayed in a screen. This operation is, for example, memory recall, and a list of memory recall jobs is displayed in the screen. On the other hand, in the fifth embodiment, memory recall jobs are bound further. When a user selects an operation of bind and selects a file in a file list, if the file is registered by the computer 12, a file list of the recently used files in the computer 12 and a file list of files in the shared folder in the computer 12 are obtained. Then, the two file lists are compared with each other, and files included in the two file lists are displayed preferentially. Thus, the user can select one or more files to be bound with the file selected first. When the determine button is pressed after the selection of files to be bound, the files are bound. When an operation such as release storage or release lock is selected, a similar screen is displayed on the stored files or on the secret print files.

Figure 19:
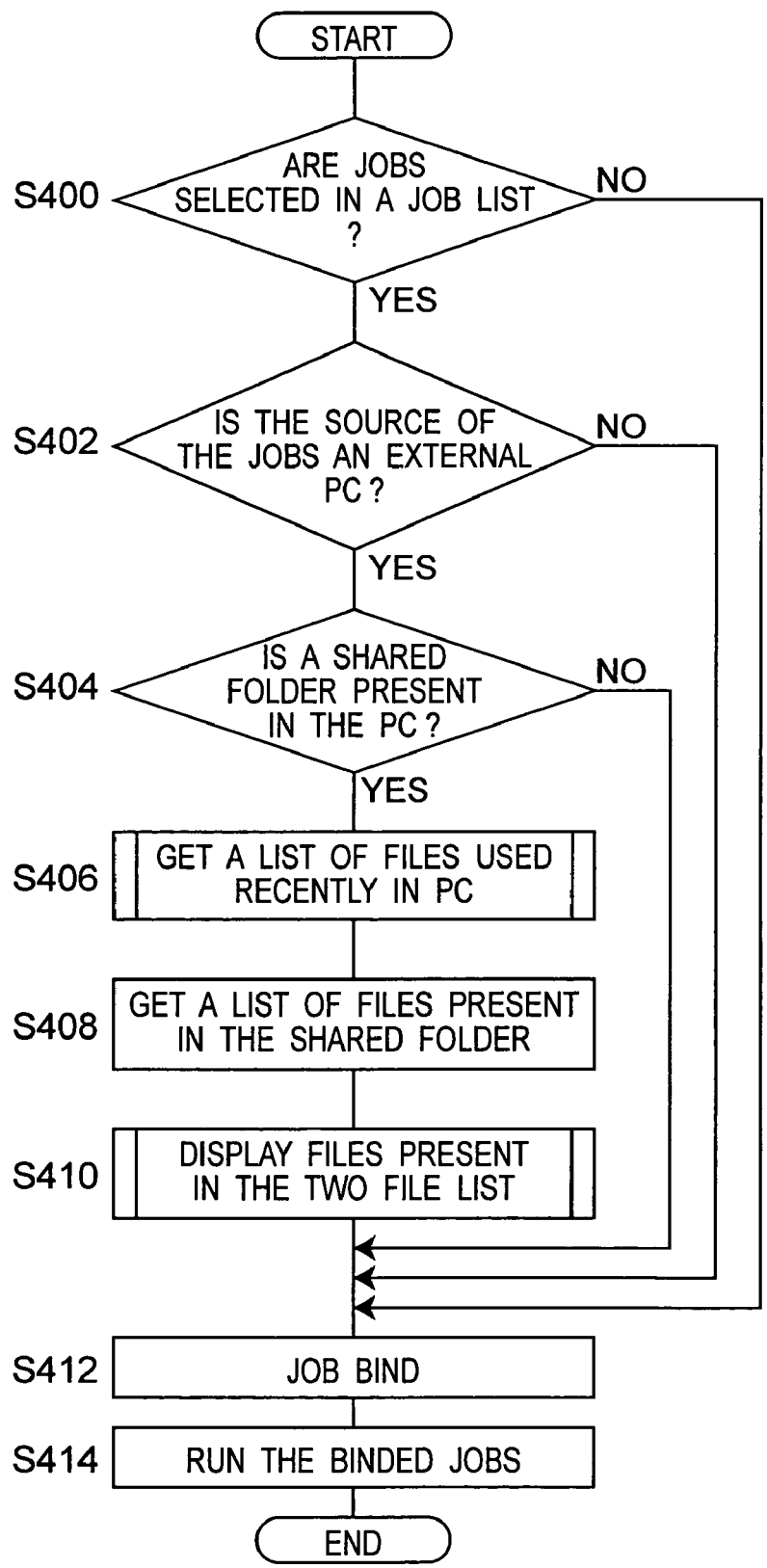
FIG. 19 is a flowchart of a processing of file binding.

FIG. 19 is a flowchart of a processing of file bind of the system controller 20 in the MFP 10. When a file is selected in a file list of memory recall jobs (YES at S400), if the source of the file is an external computer (YES at S402), and if a shared folder is present in the computer (YES at S404), a file list of the recently used files in the computer is obtained (S406), and a list of files in the shared folder is obtained (S408). Then files included in the two file lists simultaneously are displayed (S410). When the user presses the determine button, a binding of the files is executed (S412). Further, an operation such as print or transmit on the bound files is executed according to an instruction of the user (S414).

In the above-mentioned embodiments, the MFP is explained, but the invention can also be applied to a different image processing apparatus such as a printer or a file server. Further, a non-transitory computer readable storage medium, such as a hard disk, is used as a storage medium, but, for example, a flash memory or a non-volatile RAM may also be used.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus connected through a network to an external apparatus having a storage area configured to be accessible from the image processing apparatus, the image processing apparatus comprising:
    an internal storage area provided in the image processing apparatus for storing files;
    a controller for operating a file or files stored in said internal storage area and/or a file or files stored in the storage area provided in the external apparatus; and
    a display device which displays the file or files operable with said controller when said controller is operated; wherein
    the controller acquires from the external apparatus a list of recently used files in the external apparatus;
    the controller judges whether or not a file or files stored in the storage area provided in the external apparatus are included in the acquired list of recently used files; and
    when it is judged by the controller that the file or files stored in the storage area provided in the external apparatus are included in the acquired list of recently used files, the controller assigns a first priority value to the file or files, and when it is judged by the controller that the file or files stored in the storage area provided in the external apparatus are not included in the acquired list of recently used files, the controller assigns a second priority value to the file or files; and
    wherein said display device displays the file or files preferentially according to the assigned first and second priority values when a file is operated with the controller.

2. The image processing apparatus according to claim 1, wherein the list of recently used files includes a recently opened file or files in the external apparatus.

3. The image processing apparatus according to claim 1, wherein a file operation performed with the controller includes an operation for binding a plurality of files.

4. The image processing apparatus according to claim 3, wherein when a plurality of files are to be bound, the display device displays at least one of the plurality of files to be bound and the controller receives an operation to select the at least one of the plurality of files to be bound, and when the at least one selected file is stored in the external device, the controller acquires the list of recently used files from the external apparatus having the storage area storing the selected file and displays the recognized file or files as a file or files to be bound with the selected file.

5. The image processing apparatus according to claim 2, further comprising an identifier which identifies the recently opened file or files in the image processing apparatus among the files stored in the internal storage area, wherein the display device displays the identified recently opened file or files in the image processing apparatus.

6. The image processing apparatus according to claim 1, wherein an operation of a file with the controller includes a memory recall.

7. The image processing apparatus according to claim 1, wherein
    the display device displays the file or files in at least two separate lists when said controller is operated, and displays simultaneously the recognized file or files in one of the at least two separate lists and other file or files in the other of the at least two separate lists when a file is operated with the controller.

8. A non-transitory storage medium readable by an image processing apparatus connected through a network to an external apparatus having an external storage area configured to be accessible from the image processing apparatus, the image processing apparatus including an internal storage area provided in the image processing apparatus for storing files, a controller for operating a file or files in the internal storage area and/or a file or files stored in the external storage area provided in the external apparatus, and a display device which displays a file or files operable with the controller when the controller is operated, the storage medium storing a program causing the image processing apparatus to execute steps of:
    acquiring from the external apparatus a list of recently used files in the external apparatus;
    judging whether or not a file or files stored in the external storage area provided in the external apparatus are included in the acquired list of recently used files; and
    when it is judged that the file or files stored in the storage area provided in the external apparatus are included in the acquired list of recently used files; assigning a first priority value to the file or files, and when it is judged that the file or files stored in the storage area provided in the external apparatus are not included in the acquired list of recently of used files, assigning a second priority value to the file or files; and
    displaying the file or files preferentially according to the assigned first and second priority values when a file is operated with the controller.

9. The non-transitory storage medium according to claim 8, wherein
    the program causes the image processing apparatus to display the file or files in at least two separate lists when the controller is operated, and to display simultaneously the recognized file or files in one of the at least two separate lists and other file or files in the other of the at least two separate lists when a file is operated with the controller.

* * * * *